Figures 1, 2:
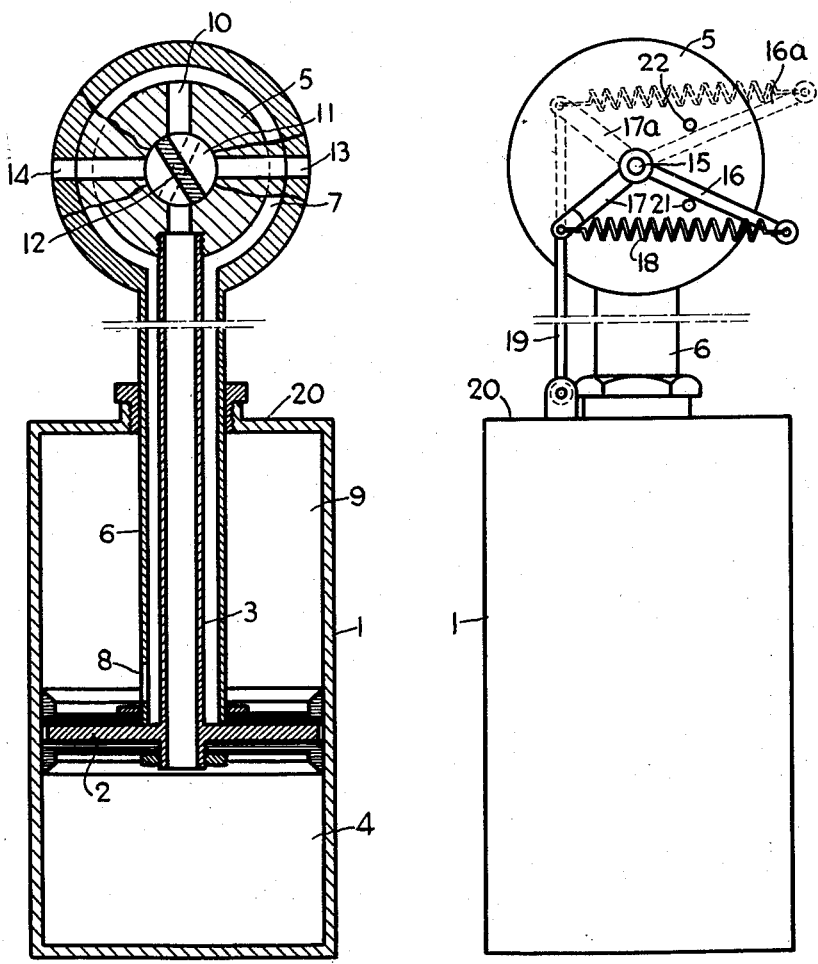

April 21, 1953 P. B. DAMGAARD 2,635,585
VALVE AND ACTUATING MEANS FOR FLUID MOTORS
Filed Feb. 4, 1948

Inventor
Poul Björn Damgaard,
By Flocks and Simon
Attorneys

Patented Apr. 21, 1953

2,635,585

UNITED STATES PATENT OFFICE 2,635,585

VALVE AND ACTUATING MEANS FOR FLUID MOTORS

Poul Björn Damgaard, Copenhagen, Denmark

Application February 4, 1948, Serial No. 6,311
In Denmark February 8, 1947

1 Claim. (Cl. 121—50)

This invention relates to irrigating devices employed for watering relatively large areas by overhead spraying, such as are used by market gardeners or farmers for watering crops or by those responsible for the upkeep of tennis lawns and the like.

Many such devices have been proposed in the past which comprise an element carrying one or more spraying nozzles and caused to rotate by the action or reaction of the water supplied to or leaving the nozzles, but these are not entirely satisfactory in that the water is distributed over a more or less circular area with a greater deposition near the centre than near the outer edge. It is also known to provide relatively long and substantially horizontally disposed pipes or tubes formed with spraying apertures along their length, hydraulic motors being provided for oscillating the pipes about their own axes in order to spray more-or-less rectangular areas with a higher degree of uniformity. The hydraulic motors have been operated by the water under pressure supplied to the spraying pipes but, as heretofore proposed, they have been relatively complicated in construction, easily damaged and entail correspondingly high upkeep costs.

The present invention has for its main object to provide an improved hydraulic motor for irrigating devices of the last-mentioned character which shall be of a robust and simple construction that will be efficient in operation and require but little maintenance.

Accordingly, this invention consists in a hydraulic motor supplied with water from the same source as the spraying device and adapted to be operatively connected to the latter to cause the oscillation thereof, wherein the motor comprises a cylinder, a double-acting piston working therein, valve means mounted on the piston rod to direct the supply of water to the one or other end of the cylinder and simultaneously to place the opposite end of the cylinder in communication with a discharge opening, and means actuated by relative motion between the piston and the cylinder for operating the valve means from one setting to another as the piston reaches a predetermined point in its stroke.

The valve means preferably consists of a multi-way cock arranged to control two passages for the flow of water formed through the piston rod and each opening to the respective side of the piston within the cylinder.

In order that the invention may be clearly understood, there will now be described one example of the way in which it may be carried into effect, reference being made to the accompanying somewhat diagrammatic drawings, wherein:

Fig. 1 is an axial section through a hydraulic motor according to the invention, part of the valve means being sectioned on a slightly different plane and the spraying device with its connection to the motor being omitted, and Fig. 2 is an elevation of the motor shown in Fig. 1.

The hydraulic motor shown comprises (see Fig. 1) a cylinder 1 within which works a double-acting piston 2 secured on the inner end of a tubular piston rod 3, the passage through the rod opening to the face of the piston which is exposed to the cylinder-chamber 4 at one side of the piston. The piston rod 3 is secured at its outer end in a bore formed in the body 5 of a multi-way cock, passing through a larger diameter aperture in this body in which is secured the outer end of a tube 6 that surrounds the tubular piston rod 3 with considerable clearance and is secured at its inner end to the piston 2.

Within the body 5 of the multi-way cock is formed a circularly extending passage 7 which is in free communication at one point with the annular passage left between the tubular piston rod 3 and the tube 6, and, through this passage and an aperture 8 formed in the inner end of the tube 6, is thus in free communication with the cylinder-chamber 9 at the side of the piston 2 remote from the chamber 4. At a point opposite to its connection with the annular passage between the parts 3 and 6, the passage 7 is placed in free communication, by way of a passage 10, with a central chamber 11 formed in the body 5 to accommodate a plug member 12 capable of oscillation from the position shown in full lines in Fig. 1 to the position shown in broken lines in that figure. In the first or full-line position of the plug member 12, the passage 10 is placed in free communication with a passage 13 formed in the body 5 to lead from the outer surface thereof into the chamber 11 but passing to one side of the passage 7. At the same time, the interior of the tubular piston rod 3 is placed in free communication with a passage 14 also formed in the body 5 to lead from the outer surface thereof into the chamber 11 but again passing to one side of the passage 7, it being understood that the bore in which the piston rod 3 is secured leads into the chamber 11 diametrically opposite to the passage 10 and that the passages 13 and 14 are also diametrically opposed.

In the second or broken-line position of the plug member 12, the passages 10 and 14 are placed in communication with each other while the passage 13 is placed in communication with the bore leading to the interior of the tubular piston rod 3.

Pipes (not shown) are connected one to the outer end of each of the passages 13 and 14, one pipe (assumed to be that connected to the passage 13) supplying water under pressure, and the other being connected to the inlet of a water-spraying device (also not shown) which is intended to be oscillated about a fixed axis by means of the hydraulic motor now being described. The spraying device may be connected by an arm and link to the body 5 of the multi-way cock, in which case the cylinder 1 would be fixed and the pipes would be of a flexible character, or may be connected to the cylinder 1, in which case the body 5 would be fixed and only the pipe leading therefrom to the inlet of the spraying device need be flexible.

Referring now to Fig. 2, the plug member 12 is fixedly mounted on a spindle 15 which extends outside the body 5 to have mounted thereon the inner ends of an arm 16 and an arm 17, the former being secured on the spindle and the latter being freely rotatable thereon. In their positions corresponding to the full-line position of the plug member 12 in Fig. 1 (see the full lines in Fig. 2), the arms 16 and 17 extend to opposite sides of a plane containing the axes of both the cylinder 1 and the spindle 15 but to the same side of a plane at right-angles to the said plane and passing through the spindle axis. The outer ends of the arms 16 and 17 are connected by a tension spring 18 and the outer end of the arm 17 is also connected by a rigid link 19 to a fixed point, as shown, to the adjacent end 20 of the cylinder 1.

The full-line position of the arm 16 is determined by a stop, such as that shown at 21, and a second stop, such as that shown at 22, serves to arrest the arm 16 in its dotted-line position 16a (Fig. 2) corresponding to the dotted-line position of the plug member 12 shown in Fig. 1. The arm 16 is displaced with a snap action between its extreme positions due to movement of the arm 17 and the consequent displacement of the line of action of the spring 18 beyond the axis of the spindle 15, as will be understood.

In the operation of the device described, the piston 2 being assumed to be at the end of its one stroke in which the parts are in the full-line positions shown, water under pressure supplied through passage 13 flows through passages 10 and 7 and tube 6 to the cylinder-chamber 9 and forces the piston 2 away from the end 20 of the cylinder, the water in the chamber 4 meanwhile being delivered by way of the tubular piston rod 3 and passage 14 to the spraying device. The piston continues to move relative to the cylinder, causing the spraying device to swing on its axis and the body 5 with the spindle 15 to move towards the cylinder-end 20, until the position of the arm 17 relative to the arm 16 is that indicated at 17a in Fig. 2, whereupon the spring 18 causes the arm 16 to move rapidly to the position shown at 16a in Fig. 2.

As the flow of water into and out from the chambers 4 and 9 is now reversed, the piston 2 immediately reverses its direction of travel and continues to move towards the end 20 of the cylinder until the motion of the spindle 15 relative to the arm 17 causes the arm 16 to be snapped over into its full-line position again, whereupon the above-indicated cycle is repeated continuously so long as water under pressure is supplied to the passage 13.

The spraying device is therefore continuously oscillated on its axis so that the line along which the jets of water issuing therefrom strike the ground is caused to sweep backwards and forwards across the area being irrigated while remaining substantially parallel with the axis of the spraying device.

It will be seen that the motor described is extremely simple and robust in construction and has very few moving parts while requiring but the minimum of pipe connections.

What I claim is:

An automatically reversing hydraulic reciprocating motor comprising a cylinder, a double-acting piston working in the cylinder, a piston rod connected at one end to the piston and extending at its other end externally of the cylinder, a first passage formed through the piston rod to open to one working face of the piston, a second passage formed through the piston rod to open to the other working face of the piston, a valve body fixedly mounted on the piston rod externally of the cylinder, an inlet for admitting fluid under pressure to said valve body, an outlet exhausting fluid from said valve body, a chamber formed in the valve body, a first passage formed in the valve body to establish communication between said inlet and said chamber, a second passage formed in the valve body to establish communication between said outlet and said chamber, a third passage formed in the valve body to establish communication between the second passage in the piston rod and said chamber, a fourth passage formed in the valve body to establish communication between the first passage in the piston rod and said chamber, a valve element rotatably mounted within said chamber and having a part extending to the exterior of the valve body, an actuating arm secured on said part of the valve element, stop means mounted on the valve body to co-operate with said arm in defining two spaced limiting positions of said valve element, a second arm pivotally mounted on the valve body, a link articulatedly connecting the second arm to the cylinder whereby reciprocating motion of the piston relative to the cylinder will cause the second arm to rock to-and-fro about its pivot, and snap spring means connecting the actuating arm and said second arm so that the actuating arm is moved rapidly against each of the stop means in alternation as the second arm executed its rocking motion, the valve element in one limiting position establishing communication between the first and third passages in the valve body and between the second and fourth passages in the valve body, and in the other limiting position establishing communication between the first and fourth passages in the valve body and between the second and third passages in the valve body.

POUL BJÖRN DAMGAARD.

References Cited in the file of this patent

UNITED STATES PATENTS

| Number | Name | Date |
|--------|------|------|
| 892,531 | Lewis | July 7, 1908 |
| 897,433 | Wagner et al. | Sept. 1, 1908 |
| 963,581 | Kelso | July 5, 1910 |
| 1,258,337 | Imblum | Mar. 5, 1918 |
| 1,454,332 | Norton | May 8, 1923 |
| 2,069,016 | Newton | Jan. 26, 1937 |
| 2,124,797 | Rust et al. | July 26, 1938 |

FOREIGN PATENTS

| Number | Country | Date |
|--------|---------|------|
| 17,720 | Great Britain | Oct. 26, 1887 |
| 174,467 | Germany | Sept. 4, 1906 |